(No Model.)
S. B. WORTMANN.
MECHANICAL MOVEMENT.
No. 461,993. Patented Oct. 27, 1891.
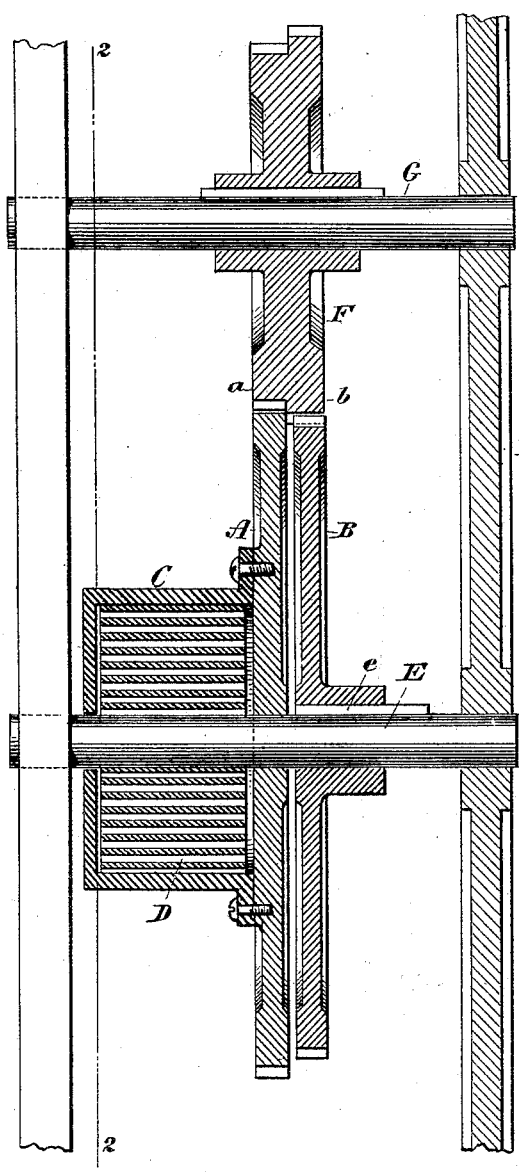
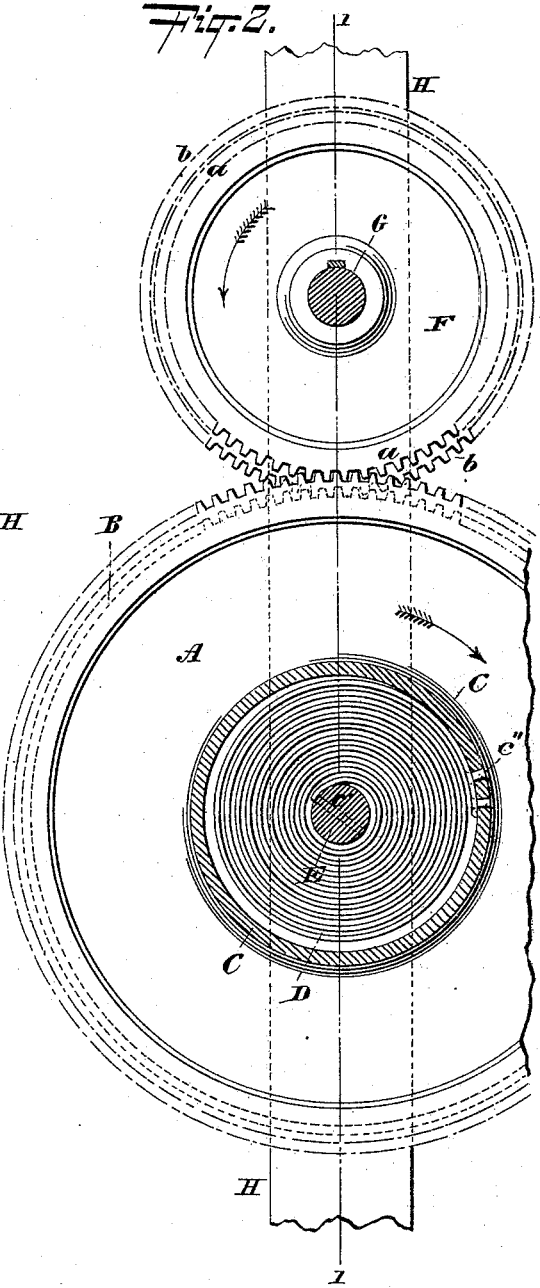
WITNESSES:
INVENTOR

UNITED STATES PATENT OFFICE.

SIGISMUND B. WORTMANN, OF NEW YORK, N. Y.

MECHANICAL MOVEMENT.

SPECIFICATION forming part of Letters Patent No. 461,993, dated October 27, 1891.

Application filed March 26, 1891. Serial No. 386,501. (No model.)

*To all whom it may concern:*

Be it known that I, SIGISMUND B. WORTMANN, a citizen of the United States, residing at New York, in the county of New York and State of New York, have invented certain new and useful Improvements in Mechanical Movements; and I do hereby declare the following to be a full, clear, and exact description of the invention, such as will enable others skilled in the art to which it appertains to make and use the same.

The nature of this invention is a mechanical movement designed to utilize the power of a coiled spring for operating or running a clock or other machine, having a prime moving shaft adapted to take power from a source of energy, as a spring, and transmit it to the operating mechanism.

The object of the present invention is to obtain under the reaction or unwinding of a spiral spring an increased number of revolutions of the spring axle or shaft, which is greatly in excess of the number of times the shaft or axle is rotated to wind the spring and thus prolong the period of time required for uncoiling the spring, whereby the spring-axle or shaft is driven for a longer period of time with one winding of the spring.

With these ends in view my invention comprises in a mechanical movement a prime-moving wheel adapted to be actuated by the spring, another wheel fast to the spring-arbor or shaft and of different diameter, either larger or smaller than the prime-moving wheel, and a compound wheel or transmitting device operating in connection with the prime-moving wheel and the fast wheel, so that the power of the spring is transmitted through the prime-moving wheel and the compound wheel to the fast wheel and axle.

The movement is especially applicable to clocks which it is designed to run for a much longer time than can be attained by any other combination of mechanical parts known to me; but I would have it understood that I do not restrict myself to this particular adaptation of my improvement, as it can be used with advantage on other machines which are to be operated or propelled by a spring.

To enable others to understand my improvement, I will proceed to a description thereof in connection with the accompanying drawings, in which—

Figure I is a sectional elevation on the vertical plane indicated by the dotted line 1 1 of Fig. II; and Fig. II is another view, partly in elevation and partly in section, the section being taken through the coiled spring and drum on the line 2 2 of Fig. I.

Like letters of reference denote corresponding parts in both figures of the drawings, referring to which—

A is the prime-moving wheel, and B is the fast wheel keyed or otherwise rigidly fastened at $e$ to the spring-axle or shaft E. The prime moving wheel A is made or fastened rigidly with the spring drum or casing C, and this prime wheel and the drum are loose on the axle or shaft E to rotate or turn freely thereon without affecting the operation or position of the shaft or axle. With the drum or shell is arranged a coiled spring D, which is coiled around the shaft or axle, and one end of this spring is fastened to the axle and the other end thereof secured to the spring-drum, as clearly shown in Fig. II of the drawings. If preferred, the prime-moving gear may be made integral with the drum and arranged to close one end thereof, while the other end of the drum is closed by a head; but this construction is not important.

The two main wheels A B are essentially of different diameters. Thus the prime-moving wheel A is of greater diameter than the fast wheel B, as shown in the drawings; but this relative proportion of the two wheels can be varied by making the fast wheel of greater diameter than the prime moving wheel, it being necessary in every instance to make one wheel of greater diameter than the other wheel, although the relative diameters may vary in proportion to the increased or decreased number of times the fast wheel is to be rotated by a given number of turns of the prime-moving wheel under the reactive power of the spring.

F is the compound wheel, which operates in connection with the prime-moving wheel and the fast wheel to transmit the motion of the former wheel to the latter wheel. This compound wheel is keyed or splined at $g$ to a shaft G, the two shafts E G being journaled in suitable standards or supports H.

In the drawings I have shown the several wheels A B F as gear-wheels, which intermesh, and although I prefer to make the wheels in the form of gears for simplicity and economy, yet I do not restrict myself to this particular form of mechanism, as it is evident that equivalent gearing can be used to transmit the power of the spring to the axle or the shaft. For instance, I may make the wheels A B F in the form of sprocket-wheels and connect them together by sprocket-chain; or, again, the said wheels may be made in the form of flat-faced or grooved pulleys and connected by intermediate belts, or any other form of transmitting-gear may be employed, it being borne in mind that the wheels A B, of whatever form adopted, must be of different diameters.

The compound or transmitting wheel F has two portions $a$ $b$ of different diameters, the one $a$ gearing with the prime-moving wheel A and the other $b$ gearing with the fast wheel B.

The compound transmitting-wheel F is of smaller diameter, preferably, than the two main wheels, and may be made of one piece, as shown, or in two pieces; but this also is not essential.

The spring may be made wound or coiled by a suitable mechanical appliance connected either to the spring-shaft or to the countershaft, and the spring may be of any preferred strength.

With the parts constructed and arranged for operation as herein shown and described, the spring axle or shaft is made to run for a long time and to revolve under the recoil or unwinding of the spring an increased number of times as compared with the number of times required to put the spring under tension. The spring uncoils from its outer side, and the power is transmitted through the gearing to the spring axle or shaft, from which axle or shaft the power is taken to operate the clock or machine or other mechanism which it is desired to propel.

Having thus described my invention, what I claim as new, and desire to secure by Letters Patent, is—

1. In a mechanical movement, the combination of an axle or shaft, a spring and a drum therefor, the prime-moving wheel loose on said axle or shaft and arranged to be rotated by the spring as it uncoils, a fast wheel of different diameter than the loose prime-moving wheel and secured rigidly to the same axle or shaft, and the compound or duplicate transmitting-wheel gearing with the fast and loose wheels and operating to transmit the power of the spring from the loose wheel to the fast wheel and the axle or shaft to which it is secured, as set forth.

2. In a mechanical movement, the combination, with a spring and its shaft or axle, of the fast wheel carried by said shaft, the prime-moving wheel actuated by a reaction of the spring, and a transmitting-wheel operating in connection with the prime-moving wheel and the fast wheel, substantially as and for the purpose described.

3. In a mechanical movement, the combination of the continuous axle or shaft, a spring, and the transmitting-gearing comprising the two main wheels of different relative diameters, and the transmitting-wheel operating in conjunction with said main wheels to transmit the power of the spring from one main wheel to the other wheel, one of said main wheels being loose on the axle or shaft to be rotated by the reaction of the spring and the other main wheel being rigidly fastened to the same axle or shaft, as set forth.

4. In a mechanical movement, the combination, with a spring and its axle or shaft, of the transmitting-gear having the two main wheels and a compound wheel, said main wheels being of different diameters relatively to each other, one wheel being fast with the axle and the other wheel rigid with the spring-drum, and the compound wheel engaging both of said main wheels, substantially as and for the purpose set forth.

5. In a mechanical movement, the combination, with an axle and a spring and a drum therefor, of a prime-moving gear rigid with the spring-drum, another gear of different diameter than the prime gear and fixed to the spring-shaft, and a compound gear which meshes with both wheels, substantially as described.

6. In a mechanical movement, the combination of the axle or shaft, the spring-drum having the prime-moving wheel rigid therewith and fitted on the axle or shaft to turn freely on the same, the spring having its ends attached, respectively, to the spring-drum and the shaft, another gear of different diameter than the prime-moving wheel and rigid with the shaft or axle, and a compound gear which meshes with both wheels, substantially as and for the purpose set forth.

In testimony whereof I affix my signature in presence of two witnesses.

SIGISMUND B. WORTMANN.

Witnesses:
JOSEPH R. EDSON,
H. I. BERNHARD.